United States Patent
Xie et al.

(10) Patent No.: US 10,146,013 B2
(45) Date of Patent: Dec. 4, 2018

(54) AUTOMATIC INJECTION SYSTEM AND METHOD OF MANUFACTURING FERRULE

(71) Applicants: Tyco Electronics (Shanghai) Co. Ltd., Shanghai (CN); TE Connectivity Corporation, Berwyn, PA (US); Shenzhen AMI Technology Co. Ltd., Guangdong (CN)

(72) Inventors: Fengchun Xie, Shanghai (CN); Qinglong Zeng, Guangdong (CN); Yu Zhang, Shanghai (CN); Dandan Zhang, Shanghai (CN); Lvhai Hu, Shanghai (CN); Roberto Francisco-Yi Lu, Berwyn, PA (US)

(73) Assignees: Tyco Electronics (Shanghai) Co. Ltd., Shanghai (CN); TE Connectivity Corporation, Berwyn, PA (US); Shenzhen AMI Technology Co. Ltd., Guangdong (CN)

( * ) Notice: Subject to any disclaimer, the term of this patent is extended or adjusted under 35 U.S.C. 154(b) by 0 days.

(21) Appl. No.: 15/897,630

(22) Filed: Feb. 15, 2018

(65) Prior Publication Data

US 2018/0180820 A1    Jun. 28, 2018

Related U.S. Application Data

(63) Continuation of application No. PCT/IB2016/054924, filed on Aug. 17, 2016.

(30) Foreign Application Priority Data

Aug. 17, 2015   (CN) .......................... 2015 1 0504067

(51) Int. Cl.
*G02B 6/36*    (2006.01)
*G02B 6/38*    (2006.01)
(Continued)

(52) U.S. Cl.
CPC .......... *G02B 6/3861* (2013.01); *G02B 6/3843* (2013.01); *G02B 6/3885* (2013.01); *G02B 6/3866* (2013.01); *G02B 6/4226* (2013.01)

(58) Field of Classification Search
None
See application file for complete search history.

(56) References Cited

U.S. PATENT DOCUMENTS 4,984,865 A * 1/1991 Lee .................. G02B 6/3861
156/322
6,799,370 B2 * 10/2004 Shekel .................. G02B 6/362
29/707

(Continued)

FOREIGN PATENT DOCUMENTS

| JP | 2002040294 A | 2/2002 |
| JP | 2003255182 A | 9/2003 |

OTHER PUBLICATIONS

PCT International Search Report and Written Opinion of the International Searching Authority, dated Oct. 31, 2016, 12 pages.

(Continued)

*Primary Examiner* — Rhonda S Peace
(74) *Attorney, Agent, or Firm* — Barley Snyder

(57) ABSTRACT

An automatic injection system for injecting an adhesive into a plurality of bores of a multi-bore ferrule comprises an injector, a first clamp holding the ferrule at a first adhesive injection station, and a second clamp holding the ferrule at a second adhesive injection station. The injector injects the adhesive into an injection opening in the ferrule. A plurality of optical fibers are not disposed in the bores of the ferrule and the injector injects the adhesive into the ferrule until the bores are fully filled with the adhesive at the first adhesive injection station. The optical fibers are disposed in the bores of the ferrule filled with the adhesive and the injector again injects the adhesive into the ferrule at the second adhesive (Continued)

station to compensate for a loss of adhesive during an insertion of the optical fibers into the bores.

17 Claims, 5 Drawing Sheets

(51) Int. Cl.
  *G02B 6/00* (2006.01)
  *G02B 6/42* (2006.01)

(56) References Cited

U.S. PATENT DOCUMENTS

| | | | | |
|---|---|---|---|---|
| 6,926,793 | B2* | 8/2005 | Nonomura | G02B 6/3812 156/293 |
| 7,252,130 | B2* | 8/2007 | Nonomura | G02B 6/3812 156/379 |
| 9,289,920 | B2* | 3/2016 | Duinen | B29B 13/00 |
| 9,931,665 | B2* | 4/2018 | Cheung | B05C 5/0225 |
| 10,025,041 | B2* | 7/2018 | Tong | G02B 6/3861 |
| 2001/0004412 | A1* | 6/2001 | Chou | G02B 6/3807 385/80 |
| 2003/0209330 | A1* | 11/2003 | Faulkner | G02B 6/3861 156/538 |
| 2006/0245694 | A1* | 11/2006 | Chen | G02B 6/32 385/71 |
| 2009/0154884 | A1* | 6/2009 | Chen | G02B 6/32 385/79 |
| 2012/0315001 | A1* | 12/2012 | Beck | G02B 6/3861 385/78 |
| 2013/0163936 | A1* | 6/2013 | Ohta | G02B 6/3861 385/80 |
| 2014/0263402 | A1* | 9/2014 | Duinen | B29C 31/06 222/1 |
| 2015/0021825 | A1* | 1/2015 | Shaddock | B29C 39/021 264/328.1 |
| 2015/0198772 | A1* | 7/2015 | Nakama | G02B 6/3885 385/80 |
| 2016/0062054 | A1* | 3/2016 | Danley | G02B 6/3833 385/77 |
| 2016/0209600 | A1 | 7/2016 | Lee et al. | |
| 2017/0242202 | A1* | 8/2017 | Xie | G02B 6/3672 |
| 2018/0180820 | A1* | 6/2018 | Xie | G02B 6/3861 |

OTHER PUBLICATIONS

Abstract of JP2003255182, dated Sep. 10, 2003, 1 page.
Abstract of JP2002040294, dated Feb. 6, 2002, 1 page.

* cited by examiner

US 10,146,013 B2

AUTOMATIC INJECTION SYSTEM AND METHOD OF MANUFACTURING FERRULE

CROSS-REFERENCE TO RELATED APPLICATIONS

This application is a continuation of PCT International Application No. PCT/IB2016/054924, filed on Aug. 17, 2016, which claims priority under 35 U.S.C. § 119 to Chinese Patent Application No. 201510504067.3, filed on Aug. 17, 2015.

FIELD OF THE INVENTION

The present invention relates to a multi-bore ferrule and, more particularly, to injecting an adhesive into bores of the multi-bore ferrule.

BACKGROUND

A fiber optic connector generally comprises a housing and a multi-bore ferrule assembly assembled in the housing. The ferrule assembly comprises a multi-bore ferrule and optical fibers inserted into bores of the multi-bore ferrule. An existing method of manufacturing the ferrule assembly typically comprises: injecting an adhesive into the multi-bore ferrule until the bores are fully filled with the adhesive; inserting the optical fibers into the bores which are fully filled with the adhesive; and heating and curing the adhesive so as to secure the optical fibers in the multi-bore ferrule.

The adhesive is generally manually injected into the ferrule. The manual injection method is not efficient and it is difficult to accurately control an amount of the injected adhesive, affecting a quality and reducing an optical performance of the ferrule assembly.

SUMMARY

An automatic injection system for injecting an adhesive into a plurality of bores of a multi-bore ferrule comprises an injector, a first clamp holding the ferrule at a first adhesive injection station, and a second clamp holding the ferrule at a second adhesive injection station. The injector injects the adhesive into an injection opening in the ferrule. A plurality of optical fibers are not disposed in the bores of the ferrule and the injector injects the adhesive into the ferrule until the bores are fully filled with the adhesive at the first adhesive injection station. The optical fibers are disposed in the bores of the ferrule filled with the adhesive and the injector again injects the adhesive into the ferrule at the second adhesive station to compensate for a loss of adhesive during an insertion of the optical fibers into the bores.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
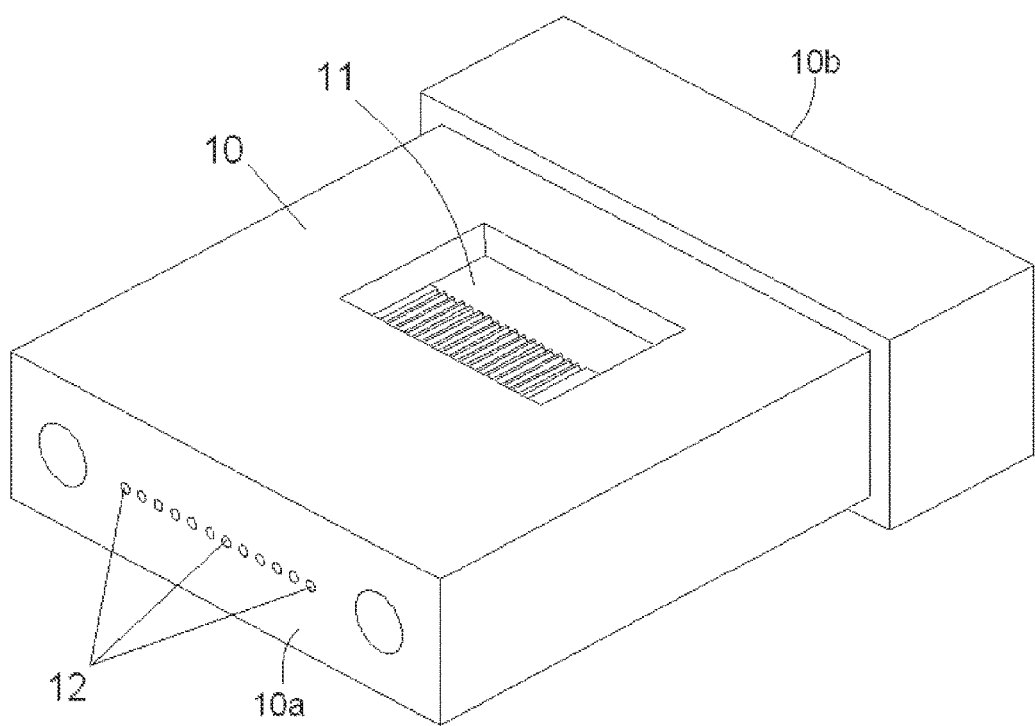
FIG. 1 is a perspective view of a multi-bore ferrule.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
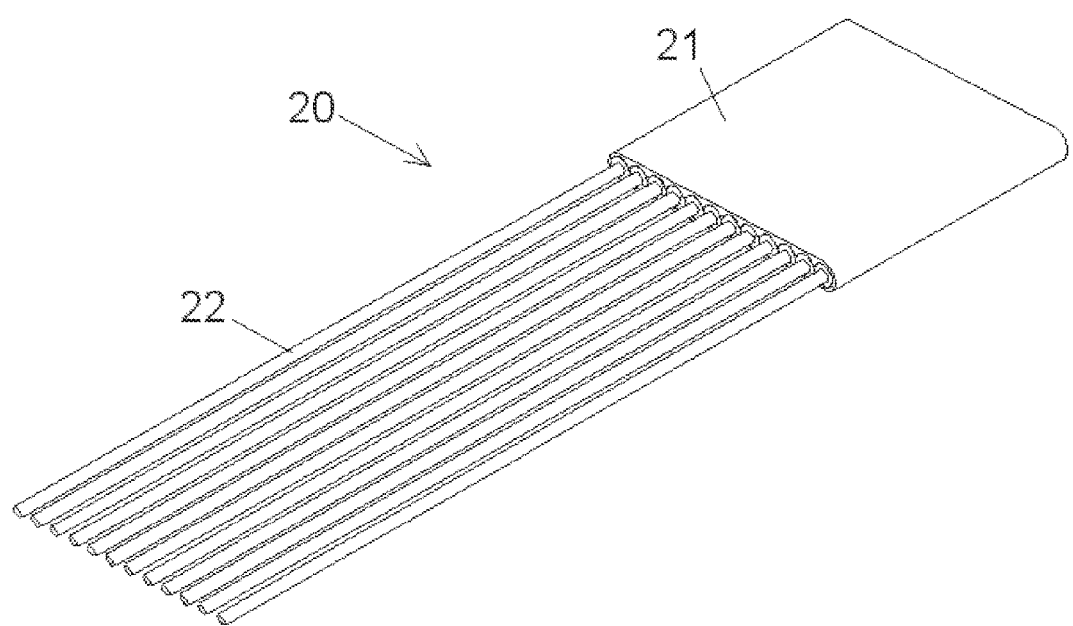
FIG. 2 is a perspective view of a ribbon cable.
Figure 3:
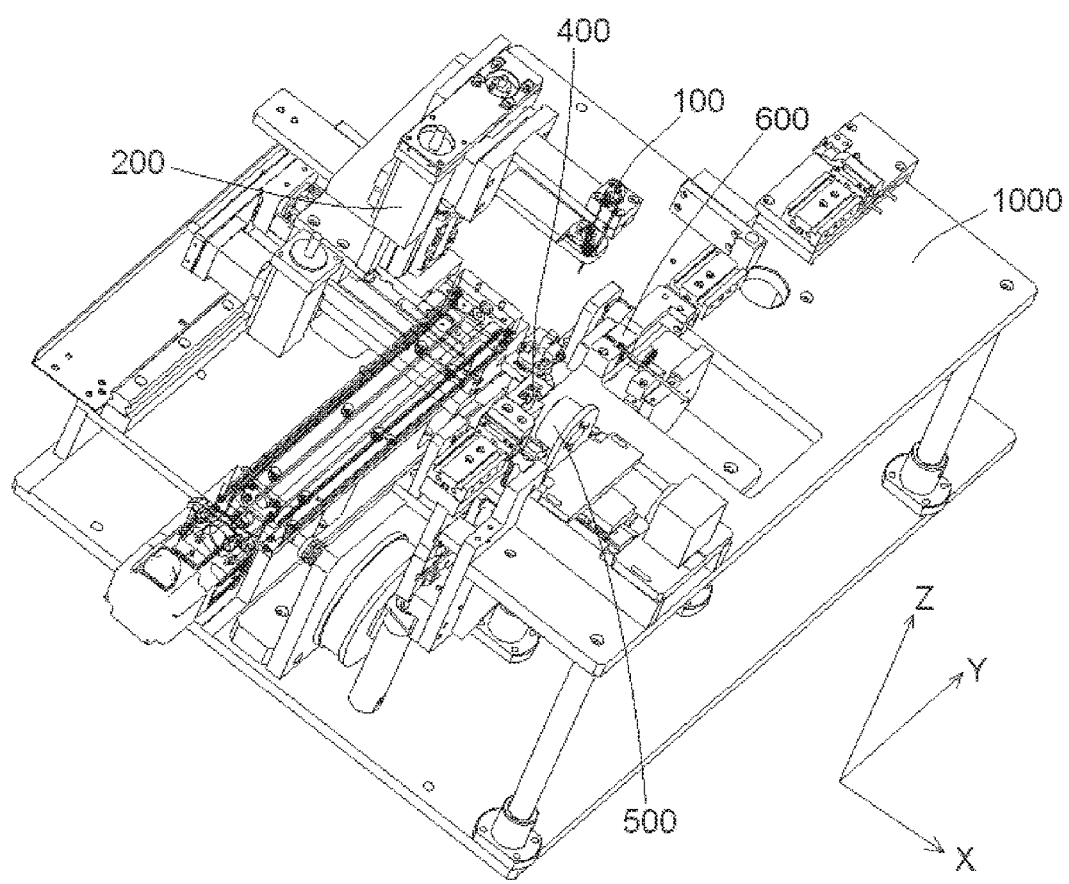
FIG. 3 is a perspective view of an automatic injection system.
Figure 4:
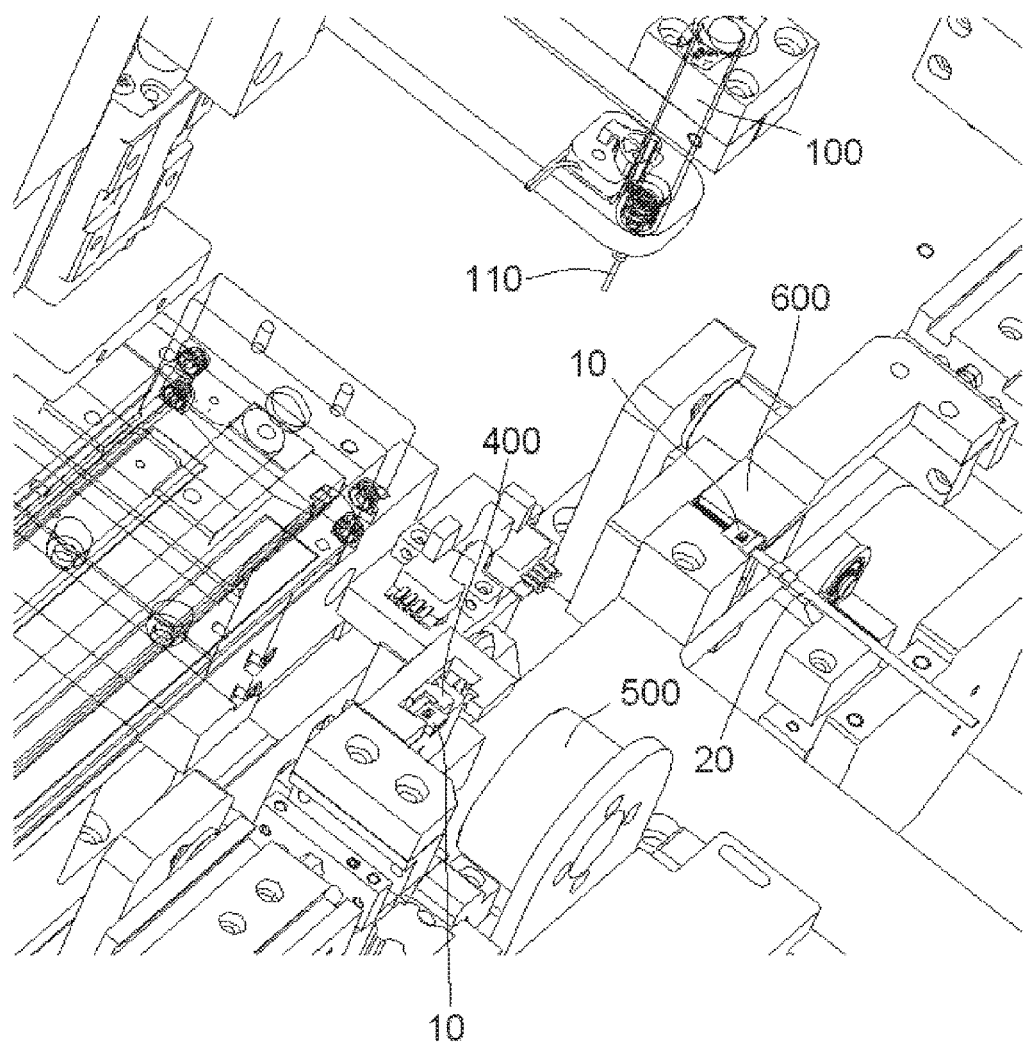
FIG. 4 is a partially enlarged view of the automatic injection system of FIG. 3.
Figure 5:
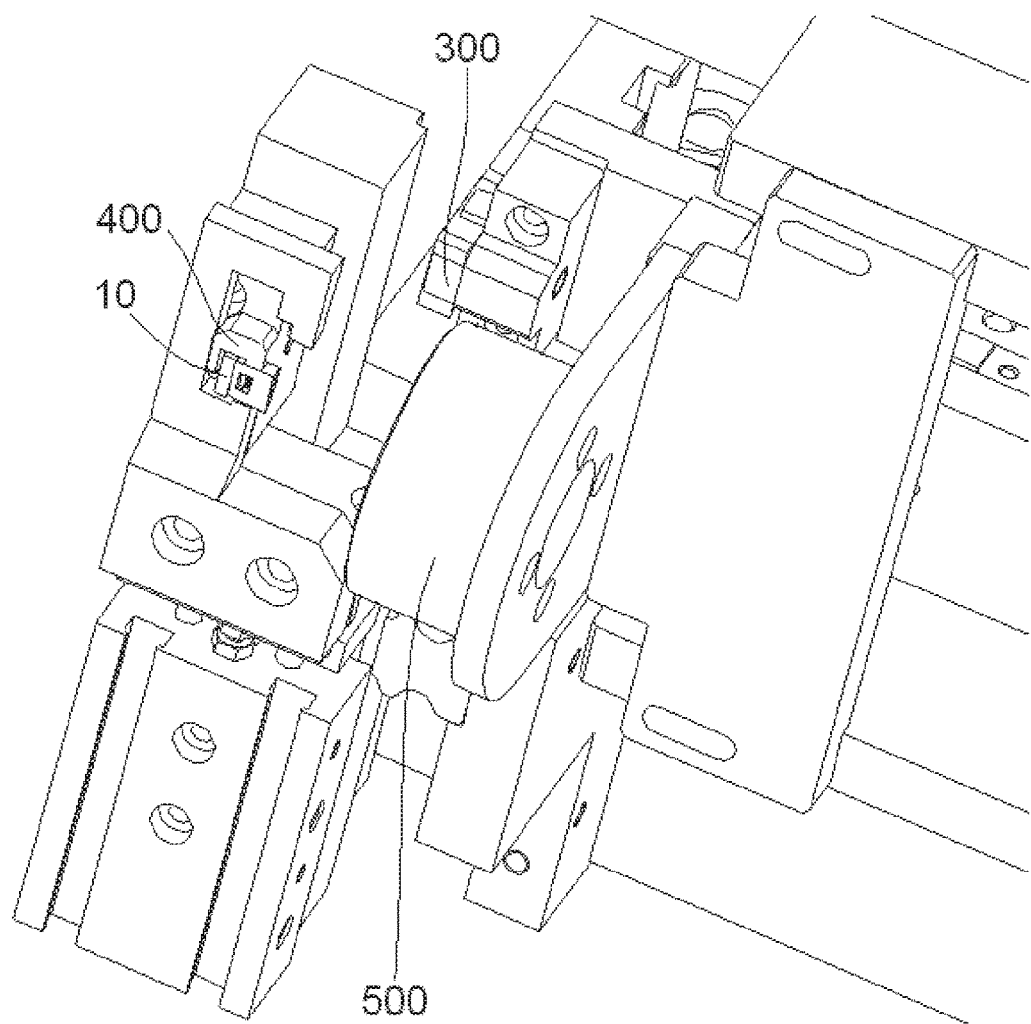
FIG. 5 is another partially enlarged view of the automatic injection system of FIG. 3.

An automatic injection system according to the invention is shown in FIGS. 3-5. FIGS. 1 and 2 show a multi-bore ferrule 10 and a ribbon cable 20 used with the automatic fiber cleaning system.

The multi-bore ferrule 10 shown in FIG. 1 has a plurality of bores 12 extending longitudinally along the multi-bore ferrule 10 and an injection opening 11 formed on a top of the multi-bore ferrule 10.

The ribbon cable 20 shown in FIG. 2 has a plurality of optical fibers 22 and an outer coating layer 21 covering the optical fibers 22. A length of the outer coating layer 21 is stripped off so as to expose a length of the optical fibers 22.

A ferrule assembly comprises the multi-bore ferrule 10 and the ribbon cable 20. The optical fibers 22 of the ribbon cable 20 are inserted into and secured in the bores 12 of the multi-bore ferrule 10. The optical fibers 22 are inserted from an insertion port at a rear end 10b of the multi-bore ferrule 10 and protrude by a predefined distance from a front end 10a of the multi-bore ferrule 10.

The automatic injection system, as shown in FIGS. 3-5, comprises an injector 100, a first clamp 400, and a second clamp 500. The automatic injection system is adapted to inject an adhesive into the bores 12 of the multi-bore ferrule 10. The injector 100 is adapted to inject the adhesive into the injection opening 11 of the multi-bore ferrule 10. The first clamp 400 is configured to clamp the multi-bore ferrule 10 and hold the multi-bore ferrule 10 at a first adhesive injection station. The second clamp 600 is configured to clamp the multi-bore ferrule 10 and hold the multi-bore ferrule 10 at a second adhesive injection station.

At the first adhesive station, the optical fibers 22 are not inserted into the bores 12 of the multi-bore ferrule 10. The injector 100 injects the adhesive into the multi-bore ferrule 10 at the first adhesive station until the bores 12 are fully filled with the adhesive.

At the second adhesive injection station, the optical fibers 22 are inserted into the bores 12, which have been fully filled with the adhesive. The injector 100 injects the adhesive again into the multi-bore ferrule 10 at the second adhesive station, with the optical fibers 22 inserted, so as to compensate the loss of adhesive during inserting the optical fibers 22.

As shown in FIGS. 3-5, the automatic injection system has a movable mechanism configured to drive the injector 100 to move to the first and second adhesive injection stations. The movable mechanism is a movable carrier 200 which is movable in a first direction, a second direction and a third direction, which are perpendicular to each other. The injector 100 is mounted on the movable carrier 200 so as to move with the movable carrier 200. In other embodiments, the movable mechanism may be a manipulator or a robot which is adapted to hold and move the injector 100. When the movable mechanism moves the injector 100 to the first or second adhesive injection station, a needle 110 of the injector 100 is aligned with the injection opening 11 of the multi-bore ferrule 10 held by the first or second clamp 400, 600.

The automatic injection system, as shown in FIGS. 3-5, has a vacuum suction device 300 at the first adhesive injection station. The vacuum suction device 300 is adapted to be attached to a front end 10a of the multi-bore ferrule 10 by a suction force so that the adhesive injected into the injection opening 11 is drawn into the bores 12.

The automatic injection system, as shown in FIGS. 3-5, has a visual detector 500 and a controller. The visual detector 500 is provided at the first adhesive injection station and is configured to detect an amount of the adhesive injected into the multi-bore ferrule 10. The controller is configured to control the injector 100 to inject the adhesive into the multi-bore ferrule 10 based on the amount of the injected adhesive detected by the visual detector 500 until all the bores 12 of the multi-bore ferrule 10 are fully filled with the adhesive. In an exemplary embodiment, the visual detector 500 is a camera. The amount of the adhesive injected into the bores 12 of the multi-bore ferrule 10 is thereby accurately controlled through a visual feedback.

As shown in FIG. 3, the automatic injection system has a stationary base plate 1000 for mounting at least one of the injector 100, the first clamp 400, the second clamp 600, the movable carrier 200, the visual detector 500, and the vacuum suction device 300, and other necessary components of the automatic injection system thereon.

A method of manufacturing a ferrule assembly using the automatic injection system will now be described in detail with reference to FIGS. 1-5. The method comprises the steps of:

S110: holding the multi-bore ferrule 10, into which optical fibers 22 are not inserted, on the first clamp 400 at the first adhesive injection station;

S120: injecting an adhesive into the multi-bore ferrule 10, with the optical fibers 22 not inserted, with the injector 100 until bores 12 of the multi-bore ferrule 10 are fully filled with the adhesive;

S130: removing the multi-bore ferrule 10 from the first clamp 400 and holding the multi-bore ferrule 10 on a second clamp 600 provided at a second adhesive injection station;

S140: inserting the optical fibers 22 into the bores 12 of the multi-bore ferrule 10 held by the second clamp 600; and S150: injecting the adhesive into the multi-bore ferrule 10 again, with the optical fibers 22 inserted, with the injector 100 to compensate the loss of adhesive during inserting the optical fibers 22.

In an embodiment, the step S120 comprises the steps of:

S121: injecting the adhesive into the injection opening 11 of the multi-bore ferrule 10, into which the optical fibers 22 are not inserted, with the injector 100; and S122: drawing the adhesive at the front end 10a of the multi-bore ferrule 10 by the vacuum suction device 300 so as to draw the adhesive injected into the injection opening 11 into the bores 12.

In another embodiment, the step S120 may further comprise the steps of:

S123: detecting an amount of the adhesive injected into the multi-bore ferrule 10 with the visual detector 500; and S124: controlling the injector 100 to inject the adhesive into the multi-bore ferrule 10 based on the amount of the injected adhesive detected by the visual detector 500 until all the bores 12 of the multi-bore ferrule 10 are fully filled with the adhesive.

In another embodiment, the method may further comprise a step of:

S160: heating and curing the adhesive in the multi-bore ferrule 10 to secure the optical fibers 22 in the bores 12 of the multi-bore ferrule 10.

What is claimed is:

1. An automatic injection system for injecting an adhesive into a plurality of bores of a multi-bore ferrule, comprising:
   an injector adapted to inject the adhesive into an injection opening in the multi-bore ferrule;
   a first clamp configured to clamp the multi-bore ferrule and hold the multi-bore ferrule at a first adhesive injection station, a plurality of optical fibers are not disposed in the bores of the multi-bore ferrule and the injector injects the adhesive into the multi-bore ferrule until the bores are fully filled with the adhesive at the first adhesive injection station; and
   a second clamp configured to clamp the multi-bore ferrule and hold the multi-bore ferrule at a second adhesive injection station, the optical fibers are disposed in the bores of the multi-bore ferrule filled with the adhesive and the injector again injects the adhesive into the multi-bore ferrule at the second adhesive station to compensate for a loss of adhesive during an insertion of the optical fibers into the bores.

2. The automatic injection system of claim 1, further comprising a movable mechanism configured to move the injector to the first adhesive injection station and the second adhesive injection station.

3. The automatic injection system of claim 2, wherein the injector has a needle aligned with the injection opening of the multi-bore ferrule at the first adhesive injection station and/or at the second adhesive injection station.

4. The automatic injection system of claim 2, wherein the movable mechanism is a movable carrier movable in a first direction, a second direction, and a third direction which are perpendicular to each other.

5. The automatic injection system of claim 4, wherein the injector is mounted on the movable carrier so as to move with the movable carrier.

6. The automatic injection system of claim 2, wherein the movable mechanism is a manipulator or robot adapted to hold and move the injector.

7. The automatic injection system of claim 2, further comprising a vacuum suction device positioned at the first adhesive injection station, the vacuum suction device adapted to be attached to a front end of the multi-bore ferrule by a suction force so that the adhesive injected into the injection opening is drawn into the bores.

8. The automatic injection system of claim 6, further comprising a visual detector positioned at the first adhesive injection station and configured to detect an amount of the adhesive injected into the multi-bore ferrule.

9. The automatic injection system of claim 8, further comprising a controller configured to control the injector to inject the adhesive into the multi-bore ferrule based on the amount of the injected adhesive detected by the visual detector until all the bores of the multi-bore ferrule are fully filled with the adhesive.

10. A method of manufacturing a ferrule assembly comprising a multi-bore ferrule having a plurality of bores and a plurality of optical fibers capable of being inserted into the bores, comprising:
   holding the multi-bore ferrule, into which the optical fibers are not inserted, on a first clamp disposed at a first adhesive injection station;
   injecting an adhesive into the multi-bore ferrule with an injector, and with the optical fibers not inserted, until the bores are fully filled with the adhesive;

removing the multi-bore ferrule from the first clamp;

holding the multi-bore ferrule on a second clamp provided at a second adhesive injection station;

inserting the optical fibers into the bores of the multi-bore ferrule held by the second clamp; and injecting the adhesive into the multi-bore ferrule again with the optical fibers inserted, so as to compensate a loss of adhesive during inserting the optical fibers.

11. The method of claim 10, further comprising moving the injector by a movable mechanism between the first adhesive injection station and the second adhesive injection station.

12. The method of claim 11, wherein the injector has a needle aligned with an injection opening of the multi-bore ferrule at the first adhesive injection station and/or at the second adhesive injection station.

13. The method of claim 11, wherein the movable mechanism is a movable carrier movable in a first direction, a second direction, and a third direction which are perpendicular to each other.

14. The method of claim 13, wherein the injector is mounted on the movable carrier so as to move with the movable carrier.

15. The method of claim 11, wherein the movable mechanism is a manipulator or robot adapted to hold and move the injector.

16. The method of claim 11, wherein the step of injecting the adhesive into the multi-bore ferrule with the injector and with the optical fibers not inserted comprises the steps of:

injecting the adhesive into an injection opening of the multi-bore ferrule with the injector; and drawing the adhesive injected into the injection opening into the bores of the multi-bore ferrule using a vacuum suction device at a front end of the multi-bore ferrule.

17. The method of claim 16, wherein the step of injecting the adhesive into the multi-bore ferrule with the injector and with the optical fibers not inserted further comprises the steps of:

detecting an amount of the adhesive injected into the multi-bore ferrule with a visual detector;

and controlling the injector to inject the adhesive into the multi-bore ferrule based on the amount of the injected adhesive detected by the visual detector until all the bores of the multi-bore ferrule are fully filled with the adhesive.

* * * * *